(12) United States Patent
Nochi

(10) Patent No.: US 12,657,565 B2
(45) Date of Patent: Jun. 16, 2026

(54) POINT-OF-SALE DEVICE, METHOD, AND PROGRAM

(71) Applicant: Toshiba Tec Kabushiki Kaisha, Tokyo (JP)

(72) Inventor: Masatoshi Nochi, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 71 days.

(21) Appl. No.: 18/919,386

(22) Filed: Oct. 17, 2024

(65) Prior Publication Data

US 2025/0315811 A1      Oct. 9, 2025

(30) Foreign Application Priority Data

Apr. 9, 2024     (JP) ................................. 2024-062903

(51) Int. Cl.
G06Q 20/20            (2012.01)
(52) U.S. Cl.
CPC ................................. G06Q 20/208 (2013.01)
(58) Field of Classification Search
CPC .................................................. G06Q 20/208
See application file for complete search history.

(56) References Cited

U.S. PATENT DOCUMENTS

| 4,779,706 A | 10/1988 | Mergenthaler | |
| 7,909,248 B1 * | 3/2011 | Goncalves | ........... G07G 1/0072 |
| | | | 235/462.14 |
| 10,121,137 B2 * | 11/2018 | Edwards | .............. G06Q 20/208 |
| 11,657,689 B1 | 5/2023 | McDaniel | |
| 2006/0185935 A1 * | 8/2006 | Tashiro | ................... G07G 3/003 |
| | | | 186/61 |

(Continued)

FOREIGN PATENT DOCUMENTS

| EP | 3147850 A1 | 3/2017 |
| JP | 2012-150841 A | 8/2012 |
| JP | 2021-125220 A | 8/2021 |

OTHER PUBLICATIONS

Razak, Mohamad Aidil Firdaus Abdul, and Kian Sek Tee. "Development of Self-Checkout in a Shop with Fraud Detection by Using Weight Comparison." Evolution in Electrical and Electronic Engineering 3.2 (2022): 1022-1029. (Year: 2022).*

(Continued)

*Primary Examiner* — Nathan A Mitchell
(74) *Attorney, Agent, or Firm* — Kim & Stewart LLP

(57)                ABSTRACT

A point-of-sale device includes a first table on which items before registration can be placed and including a first scale, a second table on which two or more bags for storing items after registration can be set and including a second scale, an input device, a display, and a processor configured to: at a beginning of a transaction, determine a first weight based on a signal from the first scale, and start a registration process, and during the registration process, determine a second weight based on a signal from the second scale, and upon input of a first operation for payment via the input device, determine the second weight as a total weight of registered items, when the first weight matches the total weight, execute a payment process, and when the first weight does not match the total weight, control the display to display an error message.

20 Claims, 6 Drawing Sheets

(56) References Cited

U.S. PATENT DOCUMENTS

| | | | | |
|---|---|---|---|---|
| 2007/0255665 A1* | 11/2007 | Oosugi | G07G 1/0054 | |
| | | | | 235/383 |
| 2008/0121702 A1* | 5/2008 | Fortenberry | G01G 19/4144 | |
| | | | | 235/383 |
| 2011/0320296 A1* | 12/2011 | Edwards | G06Q 20/208 | |
| | | | | 235/382 |
| 2014/0338987 A1* | 11/2014 | Kobres | G01G 19/4144 | |
| | | | | 177/1 |
| 2017/0083887 A1 | 3/2017 | Volta | | |
| 2017/0286939 A1* | 10/2017 | Okamura | G07G 3/003 | |
| 2018/0068291 A1* | 3/2018 | Kakino | G06Q 30/04 | |
| 2020/0311706 A1* | 10/2020 | Wood | A47F 9/048 | |
| 2021/0125467 A1* | 4/2021 | Yepez | G07G 1/0072 | |

OTHER PUBLICATIONS

Extended European Search Report mailed May 13, 2025 in corresponding European Patent Application No. 24212379.2, 10 pages.

* cited by examiner

FIG. 5

POINT-OF-SALE DEVICE, METHOD, AND PROGRAM

CROSS-REFERENCE TO RELATED APPLICATION(S)

This application is based upon and claims the benefit of priority from Japanese Patent Application No. 2024-062903, filed Apr. 9, 2024, the entire contents of which are incorporated herein by reference.

FIELD

Embodiments described herein relate generally to a point-of-sale (POS) device, a method, and a program.

BACKGROUND

Conventionally, in a retail store such as a grocery store or a convenience store, a self-checkout device in which a customer performs an item registration operation and a payment operation is used. When a customer uses such a self-checkout device, the customer places a basket or the like containing items or the items directly on a placement table near the self-checkout device. Further, the customer sets a plastic bag or their own personal shopping bag (hereinafter collectively referred to as a "bag") for storing the items. Then, the customer performs an item registration operation by taking out each item from the basket and causing a scanner or the like to read a code symbol attached to the item. When the item registration operation is performed, the self-checkout device performs an item registration process related to the item. Then, the customer puts the item that has been scanned and registered into the bag. When the item registration process has been performed on all the items in the basket, the customer performs the payment process on the items and ends the transaction.

Incidentally, when a large number of items are purchased, the bag may become full of items in the middle of the item registration operation. In such a case, since the item subjected to the subsequent item registration process cannot be put into the bag, the item is placed directly on the bagging table, and the customer needs to repack the item after the payment process. Therefore, the efficiency of the operation using the self-checkout device may be lowered.

SUMMARY OF THE INVENTION

Embodiments of the present disclosure provide a POS device, a method, and a program capable of streamlining customers' registration operation.

In one embodiment, a POS device for registering items for purchase comprises: a first table on which items before registration can be placed, the first table including a first scale; a second table with a support on which two or more bags for storing items after registration can be set, the second table including a second scale; an input device; a display; and a processor configured to: at a beginning of a transaction, determine a first weight based on a signal from the first scale, and start a registration process, and during the registration process, determine a second weight based on a signal from the second scale, and upon input of a first operation for payment via the input device, determine the second weight as a total weight of registered items, when the first weight matches the total weight, execute a payment process, and when the first weight does not match the total weight, control the display to display an error message. The processor is further configured to, during the registration process: upon input of a second operation for setting a new bag before the first operation, determine the second weight as the total weight, and perform a tare process on the second scale, determine a fourth weight based on a signal from the second scale, and upon input of the first operation, add the fourth weight to the total weight, when the first weight matches the total weight to which the fourth weight has been added, execute the payment process, and when the first weight does not match the total weight to which the fourth weight has been added, control the display to display the error message.

BRIEF DESCRIPTION OF THE DRAWINGS

FIG. 5 is a hardware block diagram illustrating a hardware configuration of the self-checkout device.

DETAILED DESCRIPTION

Hereinafter, embodiments will be described in detail with reference to the drawings. Embodiments of the present disclosure are not limited to the embodiments described below.

A self-checkout device according to an embodiment is a checkout device or a point-of-sale (POS) device installed in a store such as a grocery store, a convenience store, or a mass retailer. Such a self-checkout device performs an item registration process and a payment process on the items to be purchased by customers at a store. The self-checkout device enables the customer to perform an item registration operation and a payment operation. In response to the customer's item registration operation, the self-checkout device performs the item registration process. In response to the customer's payment operation, the self-checkout device performs the payment process.

Figure 4:
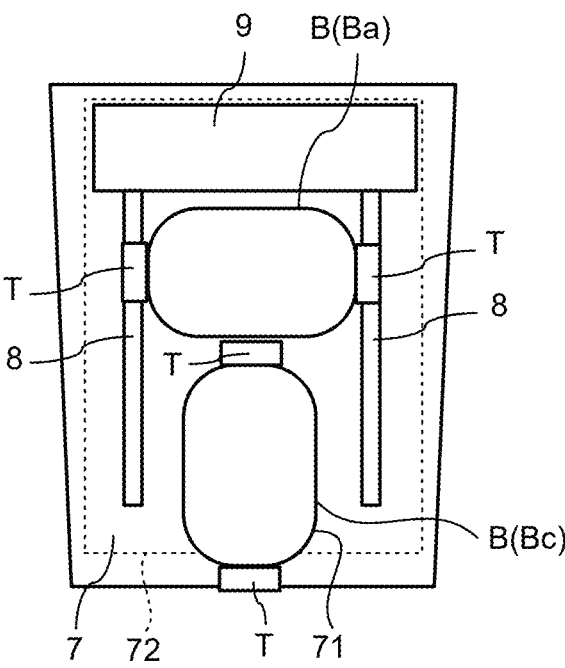
FIG. 4 is an explanatory view of the bagging table on which another bag is placed when viewed from above.
Figure 5:
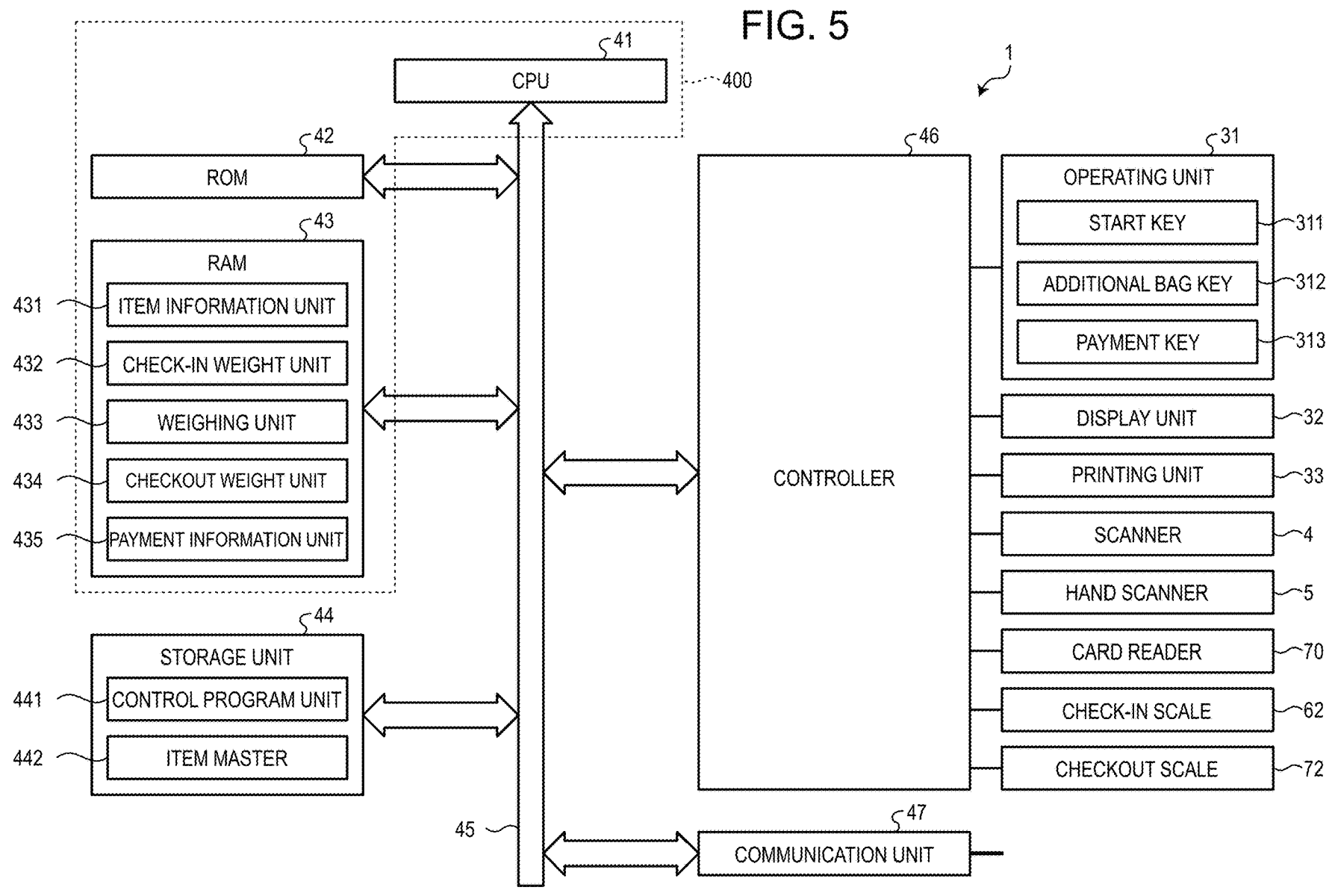

The item registration process is a process of acquiring item identification information related to an item to be sold, displaying on a display an item name and a price of the item (i.e., item information), which are acquired based on the acquired item identification information, and storing the item information in a memory or an item information unit 431 (see FIGS. 4 and 5). The payment process includes: a process of displaying the total amount of payment of the transaction based on the item information stored in the memory, a process for settlement by cash or credit card, a process of calculating and displaying the change based on the deposit in the case of the cash settlement, a process of instructing a change machine to dispense the change, and a process of issuing a receipt on which the item information and payment information (e.g., the total amount of payment, the deposit amount, the change amount, etc.) are printed.

Figure 1:
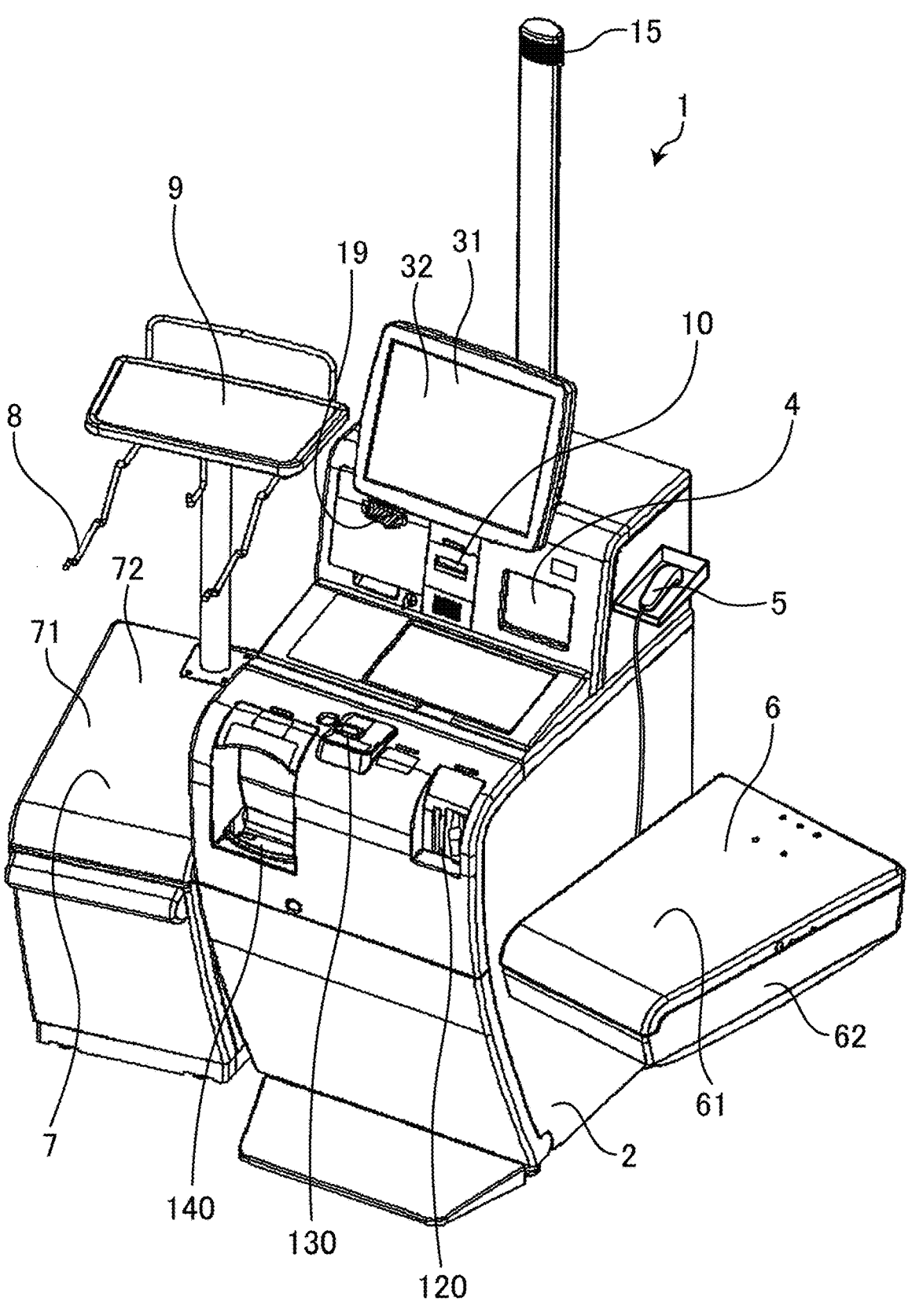
FIG. 1 is an external perspective view of a self-checkout device according to an embodiment.

FIG. 1 is an external perspective view of a self-checkout device 1 according to an embodiment. The self-checkout device 1 is a POS device or station that includes a main body 2, a placement table 6, and a bagging table 7. The main body 2 includes a display unit 32, a scanner 4, and a hand scanner 5 at an upper portion thereof. The scanner 4 and the hand scanner 5 are devices that optically image and read a code symbol, such as a bar code and a two-dimensional code, attached to an item. The self-checkout device 1 analyzes the read code symbol and acquires item identification information (for example, an item code, hereinafter referred to as an "item code") for specifying the item. An operating unit 31 is an input device including a transparent touch panel on the surface of the display unit 32 so that various software keys or buttons are displayed thereon.

For example, a liquid crystal display (LCD) is used as the display unit 32. The display unit 32 displays a guidance screen for notifying a customer of the operation method of the self-checkout device 1. Further, the display unit 32 displays the item information of the item subjected to the item registration process. The operating unit 31 includes a software keyboard displayed as the image on the display unit 32 and operable through the touch panel.

The main body 2 includes a card insertion slot 10 for inserting a card such as a customer's point card or credit card at the time of checkout. The credit card stores customer identification information and is inserted when a card payment is selected as a type of payment. Further, the main body 2 includes a receipt issuing port 19 for issuing a receipt. Further, the main body 2 includes a bill insertion and dispense port 120 for receiving bills for payment and dispensing bills for change. In addition, the main body 2 includes a coin slot 130 for receiving coins for payment, a coin outlet 140 for dispensing coins for change, and the like. Further, a pole extending upward is provided behind the main body 2. A warning light 15 is provided at an upper portion of the pole to be turned on when there is an abnormality in the operation of the self-checkout device 1 or when a store clerk is called.

The main body 2 is attached with the placement table 6 for placing a basket which stores an item that has not been settled (which has not been subjected to the item registration process). The basket is a container for storing an item to be purchased by a customer among the items displayed in the store, and the customer receives the basket when entering the store and puts the item to be purchased into the basket. The placement table 6 is provided on a side surface of the main body 2 on the upstream side (i.e., the right side of the main body 2) of the flow of the item registration operation in one embodiment. The placement table 6 has a substantially flat square upper surface 61. The basket is placed on the upper surface 61 of the placement table 6 when the item registration operation is performed.

A check-in scale 62 is provided inside the placement table 6. The check-in scale 62 is a scale for weighing the weight of an item placed on the upper surface 61 of the placement table 6. The check-in scale 62 actually measures the weight of the basket and the total weight of the item stored in the basket, but since all the baskets have a constant weight, the weight of the item stored in the basket (i.e., the total weight of the item only) obtained by subtracting the weight of the basket from the measured weight can be measured. The self-checkout device 1 stores the weight of the item weighed by the check-in scale 62 in the check-in weight unit 432 (see FIG. 5).

The customer takes out one item from the basket placed on the placement table 6 and passes the item in front of the scanner 4, thereby performing an item registration operation of causing the scanner 4 to read a code symbol attached to the item. Alternatively, one item is taken out from the basket placed on the placement table 6, and the hand scanner 5 is moved closer to perform the item registration operation of causing the hand scanner 5 to read a code symbol attached to the item. The self-checkout device 1 executes an item registration process related to the item based on the item code acquired based on the code symbols read by the scanner 4 and the hand scanner 5.

The bagging table 7 is provided on a side surface of the main body 2 opposite to the side surface to which the placement table 6 is attached. The bagging table 7 is a table on which the item subjected to the item registration operation is placed. The bagging table 7 is used for a customer to set a bag into which the item subjected to the item registration operation is placed. The bagging table 7 can hold a plurality of bags at the same time. The bagging table 7 has a substantially flat rectangular upper surface 71. The bagging table 7 has a support column extending upward from a rear portion of the upper surface 71, and a temporary table 9 is attached to an upper portion of the support column. The temporary placement table 9 is a table having a flat portion for the customer to temporarily place an item.

Further, two rod-shaped support units 8 extend forward (i.e., towards the customer side) from the temporary table 9. The support unit 8 is a support unit for the customer to set a bag (for example, hooks and attaches a handle of the bag) for storing the item that has been subjected to the item registration process. A pair of support units 8 extend substantially in parallel from the temporary table 9. Therefore, it is possible for the customer to set the handles of the bag to the support units 8 such that the upper part of the bag is opened. The support units 8 can hold one or more bags simultaneously.

Here, the bag is a container into which the registered item is stored and includes, for example, a customer's own bag (hereinafter also referred to as "my bag") or a customer's own basket brought by the customer, a shopping bag purchased by a customer at a store, and the like.

A checkout scale 72 is provided inside the bagging table 7. The checkout scale 72 is a scale for weighing the weight of an item placed on the upper surface 71 of the bagging table 7. Since the temporary table 9 and the support unit 8 are attached to the upper surface 71, the checkout scale 72 can measure the weight of the item placed on the temporary table 9 and the weight of the item placed in the bag attached to the support unit 8. The bottom surface of the bag set in the support unit 8 may be in contact with the top surface 71 or may be in a state of being separated from the top surface 71.

Figure 2:
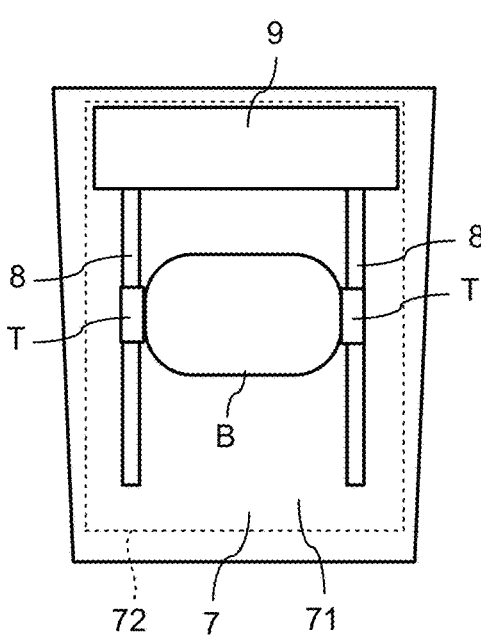
FIG. 2 is an explanatory view of a bagging table to which one bag is attached when viewed from above.

The customer hangs the bag on the support units 8. FIG. 2 is a simplified diagram showing a state of the support units 8 to which one bag is set or attached. As shown in FIG. 2, the bagging table 7 has the flat upper surface 71. The temporary placement table 9 is provided on a support column extending from the upper surface 71. A pair of support units 8 extend substantially in parallel toward the customer side from substantially both end portions of the temporary table 9. In FIG. 2, a handle of the bag B is attached to the substantially central portion of the pair of support units 8 so as to be opened.

The customer puts the item subjected to the item registration operation into the opened bag. Further, the customer temporarily places, for example, a fragile item on the temporary placement table 9 among the items subjected to the item registration operation. The checkout scale 72 measures the weight of the item stored in the bag and the weight of the item placed on the temporary placement table 9.

Here, an exemplary scenario is described in which the bag on the support units 8 become full before the item registration process is completed because the number of items placed in the basket on the placement table 6 is large.

If the bag set on the support units 8 is full, the customer can add another bag to the support unit 8 without removing the full bag from the support units 8. Alternatively, another bag can be placed or set on the upper surface 71. The customer then registers the remaining items and places them in the additional bag.

Figure 3:
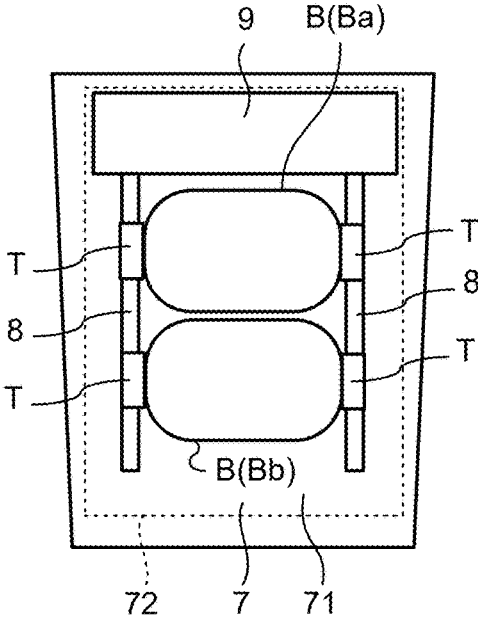
FIG. 3 is an explanatory view of the bagging table to which another bag is attached when viewed from above.

FIG. 3 is a simplified diagram showing the bagging table 7 in a state where an additional bag is set or attached to the support unit 8. As shown in FIG. 3, the full bag B (hereinafter referred to as the bag Ba) is moved to the back while being set in the support units 8, and another bag B (hereinafter referred to as the bag Bb) is added to the support units 8.

FIG. 4 is a simplified diagram showing an additional bag placed or set directly on the upper surface 71 of the bagging table 7. As shown in FIG. 4, the full bag B (i.e., the bag Ba) is moved to the back while being set in the support units 8, and another bag B (i.e., the bag Bc) is placed directly on the upper surface 71 of the bagging table 7. In FIG. 4, for example, when the full bag B (i.e., the bag Ba) is greatly inflated and it is difficult to attach the additional bag B to the support units 8, the additional bag is set as shown in FIG. 4.

In this state, when another bag B is additionally set as shown in FIG. 3 or FIG. 4, the added bag has a predetermined weight, and thus the checkout scale 72 measures the weight of the added bag in addition to the weight of the item stored in the bag. Therefore, as a countermeasure against the weight of the added bag, the customer takes the following countermeasures.

When the bag B (i.e., the bag Ba) that is already attached becomes full, the customer operates an additional bag key or button 312 (see FIG. 5) provided in the operating unit 31. Then, the self-checkout device 1 adds the weight value measured by the checkout scale 72 (accurately, the weight value stored in the weighing unit 433 (see FIG. 5)) to the checkout weight unit 434 (see FIG. 5) and stores the weight value. Then, when the additional bag is set (i.e., attached or placed), a tare process is performed in that state. That is, the self-checkout device 1 executes the tare process in which the weight value stored in the weighing unit 433 is set to "0". The weighing value of the checkout scale 72 immediately after the execution of the tare process (i.e., the weight value stored in the weighing unit 433) is "0" even though the full bag is set in the support unit 8 and the additional bag is newly set.

When an item that has been subjected to the item registration process is placed in the added bag B, the checkout scale 72 measures the weight of the item and store it in the weighing unit 433. That is, the checkout scale 72 measures the weight of the item contained in the bag B after the taring process.

When the additional bag B is also full and further additional bags are required, the additional bag key 312 is operated again to attach the third bag, the fourth bag, and the necessary number of bags to the support units 8, and perform the taring process each time. Each time the additional bag key 312 is operated, the self-checkout device 1 adds the weight value measured so far to the checkout weight unit 434.

When the item registration process of all the items is completed and all the items are stored in the bag B, the customer performs a payment operation by operating the payment key 313 (see FIG. 5). When the payment key 313 is operated, the self-checkout device 1 adds the weight value stored in the weighing unit 433 to the checkout weight unit

434. Then, the self-checkout device 1 compares the weight value stored in the check-in weight unit 432 with the weight value stored in the checkout weight unit 434, and determines whether the weight values match. If they match, the self-checkout device 1 executes a payment process related to the transaction on the basis of the item information stored in the item information unit 431.

The self-checkout device 1 according to such an embodiment can add and set another bag B without removing the full bag B when the bag B becomes full in the middle of the item registration operation. In addition, when another bag B is added, the weight of only the item that has been subjected to the item registration process thereafter can be measured, and the weight of another bag that has been added does not affect the weight. Further, the additional bag B to be added can be attached to the support units 8 or directly placed on the upper surface 71, and the weight of only the item that has been subjected to the item registration process thereafter can be measured.

The hardware configuration of the self-checkout device 1 will now be described. FIG. 5 is a block diagram illustrating a hardware configuration of the self-checkout device 1. As illustrated in FIG. 5, the self-checkout device 1 includes a processor such as a CPU (Central Processing Unit) 41, a ROM (Read Only Memory) 42, a RAM (Random Access Memory) 43, and a storage unit 44. The CPU 41 is a control circuit of the self-checkout device 1. The ROM 42 stores various programs. The RAM 43 stores programs and various types of data. The storage unit 44 stores various programs. The CPU 41, the ROM 42, the RAM 43, and the storage unit 44 are connected to each other via a bus 45. The CPU 41, the ROM 42, and the RAM 43 constitute a control unit 400. That is, the control unit 400 executes a control process of the self-checkout device 1, which will be described later, in accordance with a control program stored in the ROM 42 or the storage unit 44 and loaded onto the RAM 43.

The RAM 43 includes an item information unit 431, a check-in weight unit 432, a weighing unit 433, a checkout weight unit 434, and a payment information unit 435. The item information unit 431 stores item information (i.e., an item name, a price of an item, and the like) of the item subjected to the item registration process, which is acquired from an item master database 442 (hereinafter referred to as the item master 422) based on the acquired item code. The check-in weight unit 432 stores a weight value of the weight weighed by the check-in scale 62 (that is, the total weight of the items stored in the basket placed on the placement table 6). The weighing unit 433 stores a weight value of a weight (i.e., a real-time weight) currently weighed by the checkout scale 72.

When the additional bag key 312 is operated, the weight value stored in the weighing unit 433 is added to the weight value stored in the checkout weight unit 434. When the payment key 313 is operated, the weight value stored in the weighing unit 433 is added to the weight value stored in the checkout weight unit 434. That is, when the payment key 313 is operated, the checkout weight unit 434 stores the total weight of the item subjected to the item registration processing. The payment information unit 435 stores item information and payment information related to the item that has been subjected to the payment process.

The storage unit 44 includes a non-volatile memory such as an HDD (Hard Disc Drive or a flash memory that retains data even when the power is turned off, and includes a control program unit 441 that stores a control program and the item master 442. The item master 442 stores item information of each item in correspondence with an item code for specifying the item.

The control unit 400 is connected to the operating unit 31, the display unit 32, a printing unit 33, the scanner 4, the hand scanner 5, the card reader 70, the check-in scale 62, and the checkout scale 72 via the bus 45 and a controller 46.

The operating unit 31 includes a start key 311, an additional bag key 312, and a payment key 313. The start key 311 is a key operated by the customer when the item registration operation is started. When the start key 311 is operated, the item registration process is enabled for the item stored in the basket placed on the placement table 6. The additional bag key 312 is a key to be operated when another bag B is added and set. The payment key 313 is a key to be operated when the payment process of the item subjected to the item registration process is performed. When the payment key 313 is operated, the payment process of the item subjected to the item registration processing becomes possible.

The display unit 32 displays images of various keys operated by the customer, item information of an item subjected to item registration process, payment information subjected to the payment process, and the like. The printing unit 33 issues a receipt on which item information, payment information, and the like are printed from the receipt issuing port 19. The scanner 4 and the hand scanner 5 read a code symbol attached to an item. For example, in the case of a heavy item, the hand scanner 5 is used to read a code symbol attached thereto. The card reader 70 magnetically or electrically reads information of various cards inserted from the card insertion slot 10. The check-in scale 62 measures the weight of the item stored in the basket placed on the placement table 6. The checkout scale 72 measures the weight of the item stored in the bag B and/or the added bag B and the weight of the item placed on the temporary placement table 9. Note that the item placed on the temporary placement table 9 can be an item substantially placed in the bag B, and the checkout scale 72 measures the item placed on the temporary placement table 9 as the item placed in the bag B.

In response to an instruction from the control unit 400, the controller 46 controls the operating unit 31, the display unit 32, the printing unit 33, the scanner 4, the hand scanner 5, the card reader 70, the check-in scale 62, and the checkout scale 72. However, for convenience of explanation, the control performed by the controller 46 will be described as being performed by the control unit 400.

The control unit 400 is connected to a communication unit 47 via the bus 45. The communication unit 47 is a network interface circuit that is electrically connected to another self-checkout device 1, a store server (not shown), or the like via a communication line, and transmits and receives information to and from each other.

Figure 6:
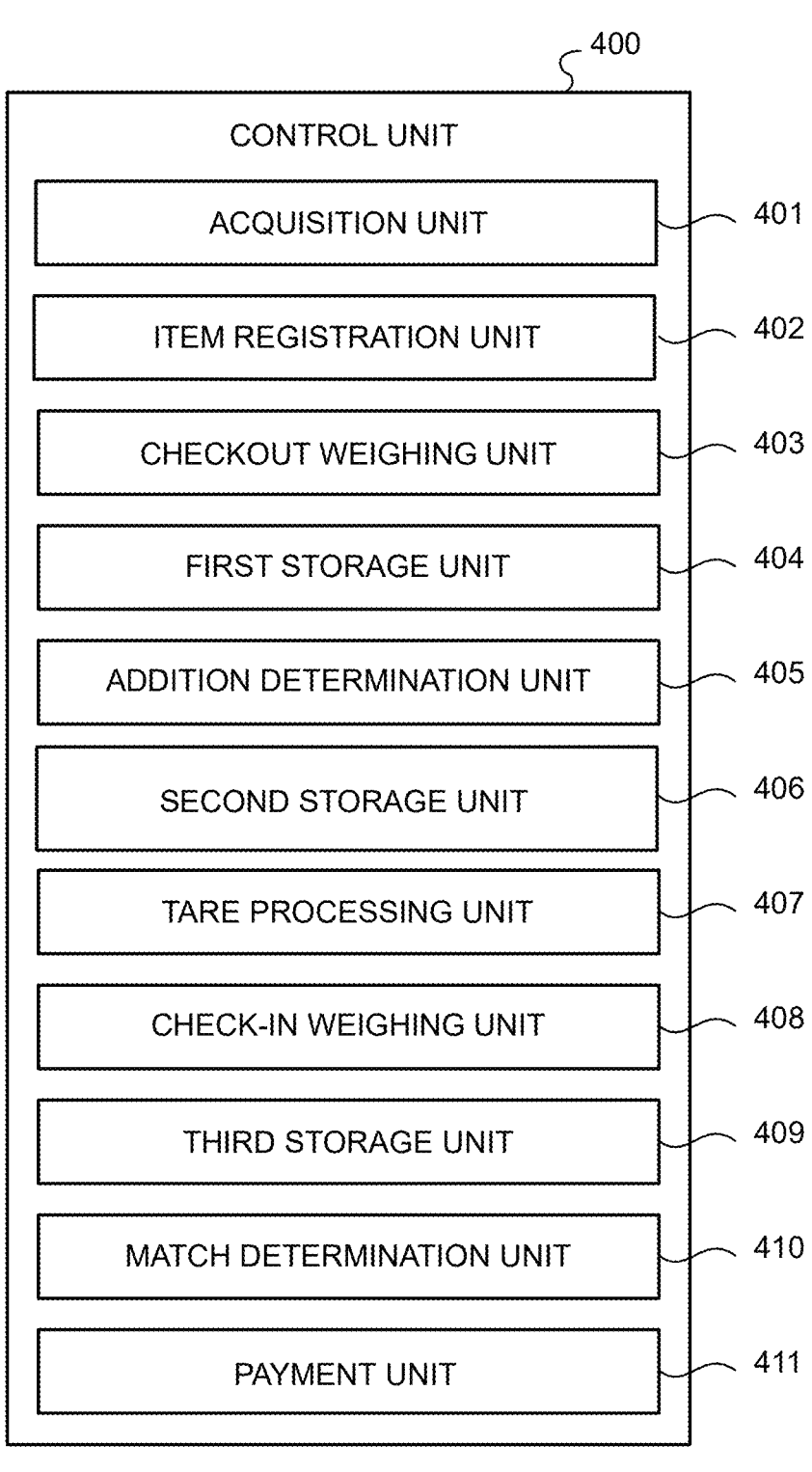
FIG. 6 is a functional block diagram illustrating a functional configuration of the self-checkout device.

Hereinafter, a functional configuration of the self-checkout device 1 according to an embodiment will be described. FIG. 6 is a functional block diagram illustrating a functional configuration of the self-checkout device 1. The control unit 400 functions as an acquisition unit 401, an item registration unit 402, a checkout weighing unit 403, a first storage unit 404, an addition determination unit 405, a second storage unit 406, a tare processing unit 407, a check-in weighing unit 408, a third storage unit 409, a match determination unit 410, and a payment unit 411 by executing the control program stored in the control program unit 441 of the ROM 42 or the storage unit 44.

The acquisition unit 401 acquires item identification information for identifying an item. In an embodiment, the acquisition unit 401 acquires an item code for specifying the item by controlling the scanner 4 or the hand scanner 5 to reading a code symbol attached to the item.

The item registration unit 402 performs an item registration process of the scanned item based on the acquired item code. In an embodiment, the item registration unit 402 searches the item master 442 based on the acquired item code, and executes the item registration process on the item.

The checkout weighing unit 403 controls the checkout scale 72 to measure the weight of the item contained in the bag B set on the bagging table 7. Note that the checkout weighing unit 403 controls the checkout scale 72 to measure the weight of the item placed on the temporary placement table 9 together with the item actually contained in the bag B as the item contained in the bag B. That is, measuring the weight of the item contained in the bag B set on the bagging table 7 can be understood as measuring the total weight of the item contained in the bag B set on the bagging table 7 and the item placed on the temporary placement table 9.

The first storage unit 404 stores the weight value weighed by the checkout weighing unit 403 in the weighing unit 433.

The addition determination unit 405 determines whether an operation of adding a bag B to be set on the bagging table 7 has been performed. In an embodiment, the addition determination unit 405 determines whether the additional bag key 312 is operated. Note that the additional determination unit 405 is not limited to determining whether the additional bag key 312 is operated, and may determine whether an operation of adding a bag B to be set to the bagging table 7 has been performed based on an operation of some kind of customer.

When determining that an operation to add a bag B has been performed, the second storage unit 406 adds the weight value stored in the weighing unit 433 to the weight value stored in the checkout weight unit 434. The second storage unit 406 adds the weight value stored in the weighing unit 433 to the weight value stored in the checkout weight unit 434 each time the addition determination unit 405 determines the addition of the bag B.

When the bag B is added, the tare processing unit 407 performs a tare process for resetting the weight value stored in the weighing unit 433. In an embodiment, the tare processing unit 407 performs the tare process for resetting the weight value stored in the weighing unit 433 to "0" when the bag B is added. The determination of whether the bag B has been added may be made based on, for example, whether there is a customer operation (for example, an operation of a key to be operated when the bag B is added) indicating that the bag B has been added, or may be made based on, for example, a sensor for detecting the added bag B, and the determination may be made based on the detection output of the sensor.

Further, the checkout weighing unit 403 measures the weight of the item contained in the bag added after the tare process by the tare processing unit 407, and the first storage unit 404 stores the weight value of the weight of the item stored in the added bag B measured by the checkout weighing unit 403 in the reset weighing unit 433.

The check-in weighing unit 408 weighs the weight of the item placed on the placement table 6 using the check-in scale 62. In an embodiment, the check-in weighing unit 408 uses the check-in scale 62 to weigh the weight of the item stored in the basket placed on the placement table 6.

The third storage unit 409 stores the weight value measured by the check-in weighing unit 408 in the check-in weight unit 432.

The match determination unit 410 determines whether the weight value stored in the checkout weight unit 434 matches the weight value stored in the check-in weight unit 432. In an embodiment, when the payment key 313 is operated, the match determination unit 410 determines whether the weight value stored in the checkout weight unit 434 matches the weight value stored in the check-in weight unit 432.

When the match determination unit 410 determines that the weight value stored in the checkout weight unit 434 matches the weight value stored in the check-in weight unit 432, the payment unit 411 executes a payment process related to the transaction. When the addition determination unit 405 determines that the bag B has been added, the payment unit 411 executes a payment process for the item stored in the original bag B and the item stored in the added bag B.

Figure 7:
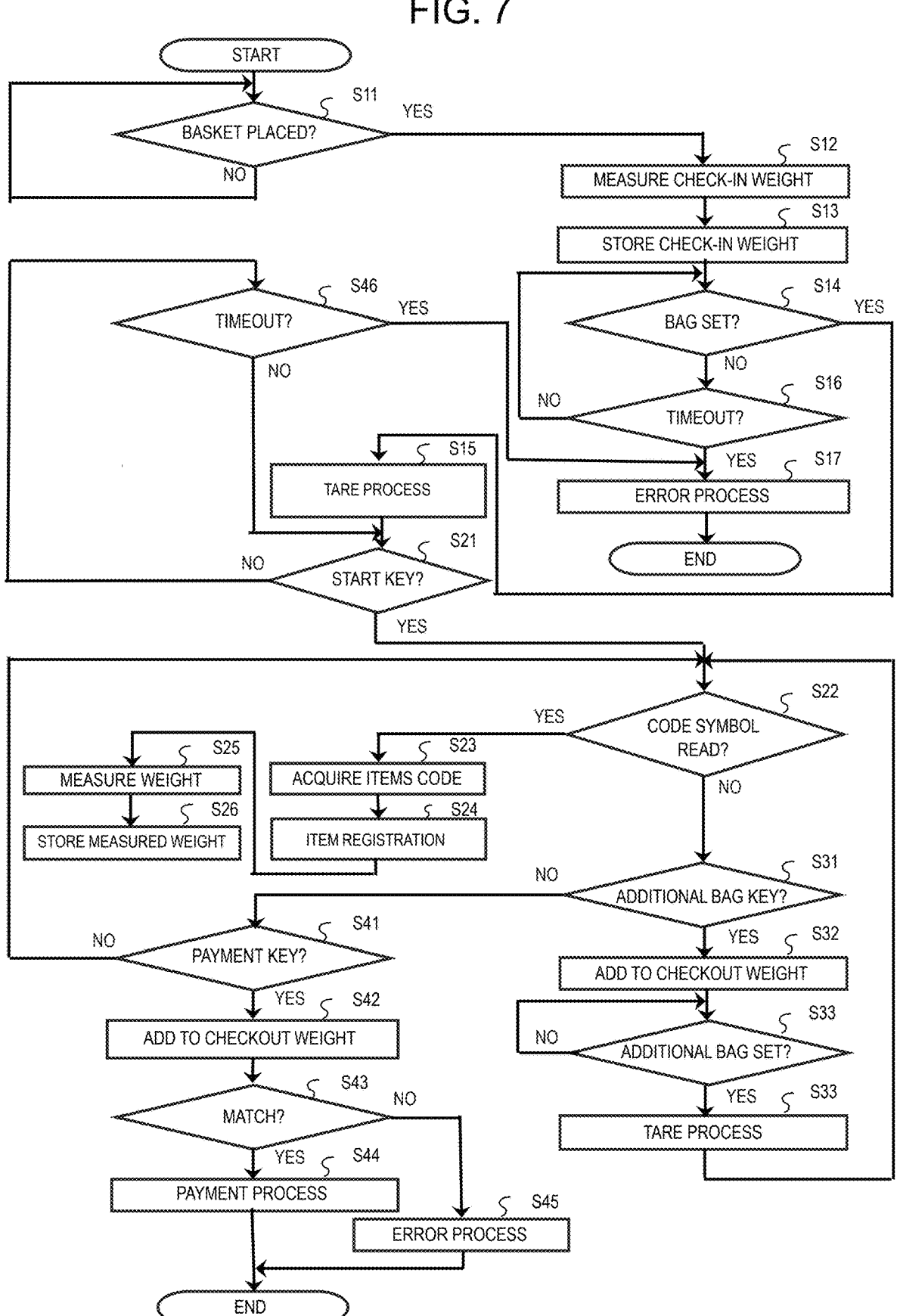
FIG. 7 is a flowchart of a control process performed by the self-checkout device.

Hereinafter, the control of the self-checkout device 1 according to an embodiment will be described. FIG. 7 is a flowchart illustrating a flow of a control process performed by the self-checkout device 1. As illustrated in FIG. 7, the control unit 400 (or the CPU 41) of the self-checkout device 1 determines whether a basket containing an item to be purchased is placed on the placement table 6 (S11). For example, the control unit 400 determines that a basket containing an item to be purchased is placed on the placement table 6 based on an output of a sensor or the like that detects the basket placed on the placement table 6. Further, the control unit 400 can make such determination based on an output from the check-in scale 62, indicating that a change in weight (i.e., an increase in weight) has been detected. If it is determined that the basket is placed (No at S11), the check-in weighing unit 408 measures the weight of the item stored in the basket (i.e., the total weight) using the check-in scale 62 (S12). The third storage unit 409 stores the weight value of the measured weight in the check-in weight unit 432 (S13).

Next, the control unit 400 determines whether a bag B is set on the support units 8 (S14). The determination as to whether the bag B has been set may be made based on, for example, whether there has been a customer operation (for example, an operation of a key operated after the bag B has been set) indicating that the bag B has been set, or may be made based on, for example, a sensor that detects the set bag B, and the determination may be made based on the detection output of the sensor. When it is determined that the bag B is set on the support units 8 (Yes at S14), the control unit 400 executes a tare process of setting the weight value of the weighing unit 433 to "0" (S15).

In addition, when it is determined that the bag B is not set on the support units 8 (No at S14), the control unit 400 determines whether a predetermined period of time has elapsed and a time out has occurred (S16). If it is determined that S16 has not time out (No at S16), the control process goes back to S14, and if it is determined that the time out has occurred (Yes at S16), the control unit 400 executes an error process (S17) and ends the control process. In the error process in this case, the control unit 400 controls the display unit 32 to display, for example, a message indicating that, since the bag B is not set, the operation should be restarted from the beginning. Note that, instead of terminating the control process after the error process of S17 is executed, the control process may go back to S14 after the error is solved.

In addition, the control unit 400 that has executed S15 determines whether the start key 311 has been operated (S21). When it is determined that the start key 311 has not been operated (No at S21), the control unit 400 determines whether the predetermined time has elapsed (S46). If it is determined that the predetermined time has not elapsed (No at S46), the control process goes back to S21, and if it is determined that the predetermined time has elapsed (Yes at S46), the control unit 400 executes the error process (S17) and ends the control process. In the error process in this case, the control unit 400 controls the display unit 32 to display, for example, a message indicating that the start key 311 has not been operated, and therefore the operation should be restarted from the beginning. Note that, instead of terminating the control process after the error process at S17, the control process may go back to S21 after the error is solved.

When it is determined that the start key 311 has been operated (Yes at S21), the control unit 400 then determines whether the scanner 4 or the hand scanner 5 has read a code symbol attached to an item (S22). When it is determined that the code symbol has been read (Yes of S22), the acquisition unit 401 acquires an item code for specifying the item based on the read code symbol (S23). Then, the item registration unit 402 executes an item registration process related to the item based on the acquired item code (S24). The customer puts the item subjected to the item registration operation into the bag B set on the support units 8. The checkout weighing unit 403 measures the item weight in the bag B (S25). Then, the first storage unit 404 stores the weight measured by the checkout weighing unit 403 (i.e., the total weight of the items contained in the bag B) in the weighing unit 433 (S26). Then, the control unit 400 returns to S22. The control unit 400 performs S22-S26 each time the customer takes out an item from a basket and performs its item registration operation.

The addition determination unit 405 determines whether the additional bag key 312 has been operated (i.e., whether an operation to add the bag B has been performed) (S31). When it is determined that the additional bag key 312 has been operated (Yes at S31), the second storage unit 406 adds the weight value stored in the weighing unit 433 to the weight value stored in the checkout weight unit 434 (S32). Next, the control unit 400 determines whether another bag B is added to the bagging table 7 and set (S33). If it is determined that another bag B has been added to the bagging table 7 (No at S33), the tare processing unit 407 executes a tare process of resetting the weight value stored in the weighing unit 433 to "0" (S34). Then, the control process returns to S22.

When the additional bag key 312 is operated again for the reason that the added bag B becomes full or the like, the control unit 400 performs S31-S34 and executes the process again. That is, when the additional bag key 312 is operated again, the second storage unit 406 adds the weight value stored in the weighing unit 433 to the weight value stored in the checkout weight unit 434 (S32). Next, the control unit 400 determines whether another bag B is additionally set on the bagging table 7 (S33). If it is determined that another bag B has been further added to the bagging table 7 (No at S33), the tare processing unit 407 executes a tare process of resetting the weight value stored in the weighing unit 433 to "0" (S34). Then, the control process returns to S22.

When it is determined that the bag additional key 312 is not operated (No at S31), the control unit 400 determines whether the payment key 313 has been operated (S41). When it is determined that the payment key 313 has not been operated (No at S41), the control process returns to S22, and when it is determined that the payment key 313 has been operated (Yes at S41), the control unit 400 adds the weight value stored in the weighing unit 433 to the weight value stored in the checkout weight unit 434 (S42).

Next, the match determination unit 410 compares the weight value stored in the check-in weight unit 432 with the weight value stored in the checkout weight unit 434, and determines whether the weight values match (S43). When it is determined that the weight value stored in the check-in weight unit 432 matches the weight value stored in the checkout weight unit 434 (Yes at S43), the payment unit 411 executes an payment process related to the transaction on the basis of the item information (i.e., item information of the item subjected to the item registration process) stored in the item information part 431 (S44). Then, the control unit 400 ends the control process or returns to S11.

On the other hand, when the match determination unit 410 determines that the weight value stored in the check-in weight unit 432 and the weight value stored in the checkout weight unit 434 do not match (No at S43), the control unit 400 executes an error process of stopping the transaction (S45). Then, the control unit 400 controls the display unit 32 to display an error message, and ends the control process or returns to S11.

The self-checkout device 1 having the above-described configuration allows a customer to add and set another bag B without removing the full bag B when the bag B becomes full in the middle of the item registration operation. Therefore, it is possible to reduce a decrease in the efficiency of the operation in the self-checkout device 1. In addition, when another bag B is added, the weight of only the item that has been subjected to the item registration process thereafter can be measured, and the weight of another bag that has been added does not affect the weight.

Additionally, even if another bag B is added, the self-checkout device 1 performs the tare process on the weight of the other bag, and therefore does not affect the determination by the match determination unit 410 as to whether the weight value stored in the checkout weight unit 434 matches the weight value stored in the check-in weight unit 432.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

For example, in the above-described embodiments, the check-in weighing unit 408, the third storage unit 409, and the match determination unit 410 are provided. However, the check-in weighing unit 408, the third storage unit 409, and the match determining unit 410 may be omitted. When those units are omitted, the payment unit 411 executes the payment process without making the determination by the match determination unit 410.

The program executed by the self-checkout device 1 is copied and installed from a non-transitory computer-readable recording medium such as a CD-ROM, a flexible disk (FD), or a CD-R, DVD (Digital Versatile Disk).

Further, the program executed by the self-checkout device 1 may be stored in a computer connected to a network such as the Internet, and may be downloaded or distributed via the network.

Further, the program executed by the self-checkout device 1 may be stored in the ROM 42 or the storage unit 44 in advance.

12

What is claimed is:

1. A point-of-sale (POS) device for registering items for purchase, the POS device comprising:
   a first table on which items before registration can be placed, the first table including a first scale;
   a second table with a support on which two or more bags for storing items after registration can be set, the second table including a second scale;
   an input device;
   a display; and
   a processor configured to:
      at a beginning of a transaction, determine a first weight based on a signal from the first scale, and start a registration process, and
      during the registration process,
         determine a second weight based on a signal from the second scale, and
         upon input of a first operation for payment via the input device,
            determine the second weight as a total weight of registered items,
            when the first weight matches the total weight, execute a payment process, and
            when the first weight does not match the total weight, control the display to display an error message, wherein
   the processor is further configured to, during the registration process:
      upon input of a second operation for setting a new bag before the first operation, determine the second weight as the total weight, and perform a tare process on the second scale,
      determine a fourth weight based on a signal from the second scale, and
      upon input of the first operation,
         add the fourth weight to the total weight,
         when the first weight matches the total weight to which the fourth weight has been added, execute the payment process, and
         when the first weight does not match the total weight to which the fourth weight has been added, control the display to display the error message.

2. The POS device according to claim 1, wherein the display includes the input device and displays buttons through which the first and second operations can be input.

3. The POS device according to claim 1, wherein the processor is configured to:
   based on a signal from the second scale, determine whether a bag is set on the second table within a predetermined time after the first weight is determined,
   upon determining that a bag is set on the second table within the predetermined time, start the registration process, and
   upon determining that a bag is not set on the second table within the predetermined time, control the display to display an error message.

4. The POS device according to claim 3, wherein the processor is configured to determine that a bag is set on the second table after the error message is displayed and then start the registration process.

5. The POS device according to claim 3, wherein the processor is configured to, upon determining that a bag is set on the second table within the predetermined time, execute the tare process before starting the registration process.

6. The POS device according to claim 1, wherein the processor is configured to, after the second operation is input:

determine whether the new bag is set on the second table based on a signal from the second scale, and upon determining that the new bag is set on the second table, execute the tare process.

7. The POS device according to claim 1, further comprising:

a scanner through which items can be registered during the registration process, wherein the scanner and the display are disposed between the first and second tables.

8. The POS device according to claim 1, wherein the support includes a pair of rods extending along a surface of the second table and on which bags can be hung.

9. The POS device according to claim 8, wherein the second table includes a temporary table on which items after registration can be temporarily placed, the rods extending from the temporary table.

10. The POS device according to claim 1, wherein the POS device is a self-service type POS device.

11. A method performed by a point-of-sale (POS) device for registering items for purchase, the POS device including:

a first table on which items before registration can be placed, the first table including a first scale, and a second table with a support on which two or more bags for storing items after registration can be set, the second table including a second scale, the method comprising:

at a beginning of a transaction, determining a first weight based on a signal from the first scale, and starting a registration process; and during the registration process, determining a second weight based on a signal from the second scale, and upon input of a first operation for payment, determining the second weight as a total weight of registered items, when the first weight matches the total weight, executing a payment process, and when the first weight does not match the total weight, displaying an error message, wherein the method further comprises, during the registration process:

upon input of a second operation for setting a new bag before the first operation, determining the second weight as the total weight, and performing a tare process on the second scale;

determining a fourth weight based on a signal from the second scale; and upon input of the first operation, adding the fourth weight to the total weight, when the first weight matches the total weight to which the fourth weight has been added, executing the payment process, and when the first weight does not match the total weight to which the fourth weight has been added, displaying the error message.

12. The method according to claim 11, further comprising:

displaying buttons through which the first and second operations can be input.

13. The method according to claim 11, further comprising:

based on a signal from the second scale, determining whether a bag is set on the second table within a predetermined time after the first weight is determined, upon determining that a bag is set on the second table within the predetermined time, starting the registration process, and upon determining that a bag is not set on the second table within the predetermined time, displaying an error message.

14. The method according to claim 13, further comprising:

determining that a bag is set on the second table after the error message is displayed and then starting the registration process.

15. The method according to claim 13, further comprising:

upon determining that a bag is set on the second table within the predetermined time, executing the tare process before starting the registration process.

16. A non-transitory computer readable medium storing a program causing a computer to execute a method for registering items for purchase, the method comprising:

at a beginning of a transaction, determining a first weight based on a signal from a first scale included in a first table on which items before registration can be placed, and starting a registration process; and during the registration process, determining a second weight based on a signal from a second scale included in a second table with a support on which two or more bags for storing items after registration can be set, and upon input of a first operation for payment, determining the second weight as a total weight of registered items, when the first weight matches the total weight, executing a payment process, and when the first weight does not match the total weight, displaying an error message, wherein the method further comprises, during the registration process:

upon input of a second operation for setting a new bag before the first operation, determining the second weight as the total weight, and performing a tare process on the second scale;

determining a fourth weight based on a signal from the second scale; and upon input of the first operation, adding the fourth weight to the total weight, when the first weight matches the total weight to which the fourth weight has been added, executing the payment process, and when the first weight does not match the total weight to which the fourth weight has been added, displaying the error message.

17. The computer readable medium according to claim 16, wherein the method further comprises:

displaying buttons through which the first and second operations can be input.

18. The computer readable medium according to claim 16, wherein the method further comprises:

based on a signal from the second scale, determining whether a bag is set on the second table within a predetermined time after the first weight is determined, upon determining that a bag is set on the second table within the predetermined time, starting the registration process, and upon determining that a bag is not set on the second table within the predetermined time, displaying an error message.

19. The computer readable medium according to claim 18, wherein the method further comprises:

determining that a bag is set on the second table after the error message is displayed and then starting the registration process.

20. The computer readable medium according to claim 18, wherein the method further comprises:

upon determining that a bag is set on the second table within the predetermined time, executing the tare process before starting the registration process.

\* \* \* \* \*